United States Patent
Miyanaga

(10) Patent No.: US 9,825,739 B2
(45) Date of Patent: Nov. 21, 2017

(54) WIRELESS RECEIVING DEVICE AND RECEIVED DATA RESTORING

(71) Applicant: RayTron, Inc., Osaka-shi, Osaka (JP)

(72) Inventor: Yoshikazu Miyanaga, Hokkaido (JP)

(73) Assignee: RAYTRON, INC., Osaka (JP)

( * ) Notice: Subject to any disclaimer, the term of this patent is extended or adjusted under 35 U.S.C. 154(b) by 0 days.

(21) Appl. No.: 15/241,774

(22) Filed: Aug. 19, 2016

(65) Prior Publication Data

US 2017/0063500 A1    Mar. 2, 2017

(30) Foreign Application Priority Data

Sep. 1, 2015   (JP) ................... 2015-172086

(51) Int. Cl.

| | |
|---|---|
| H04L 5/00 | (2006.01) |
| H04B 7/04 | (2017.01) |
| H04L 27/22 | (2006.01) |
| H04B 1/00 | (2006.01) |
| H04B 7/0413 | (2017.01) |

(52) U.S. Cl.
CPC ......... *H04L 5/0007* (2013.01); *H04B 1/0007* (2013.01); *H04B 7/0413* (2013.01); *H04L 5/0048* (2013.01); *H04L 27/22* (2013.01)

(58) Field of Classification Search
CPC ..... H04B 7/0413; H04L 27/22; H04L 5/0007; H04L 5/0048
See application file for complete search history.

(56) References Cited

U.S. PATENT DOCUMENTS

| | | | |
|---|---|---|---|
| 7,058,002 B1 * | 6/2006 | Kumagai | H04L 27/2662 370/203 |
| 8,248,975 B2 * | 8/2012 | Fujita | H04L 25/0232 370/208 |
| 2010/0034186 A1 * | 2/2010 | Zhou | H04L 27/2621 370/344 |

FOREIGN PATENT DOCUMENTS

| | | |
|---|---|---|
| JP | 2000224134 A | 8/2000 |
| JP | 2006108763 A | 4/2006 |
| WO | 2007091320 A1 | 8/2007 |

\* cited by examiner

*Primary Examiner* — Ross Varndell
(74) *Attorney, Agent, or Firm* — Hauptman Ham, LLP

(57) ABSTRACT

A wireless receiving device removes signals of a redundant portion of each symbol of a transmission signal to extract signals of a data portion. The wireless receiving device linearly approximates, for each symbol, the overall variation in phase rotation of the symbol calculated by using the signals of the data portion to estimate the amount of phase rotation per time unit of the data portion. Subsequently, the wireless receiving device individually corrects each of the signals of the data portion according to the estimated amount of phase rotation per time unit to correct the signals of the data portion in a single symbol and over a plurality of symbols accordingly on a packet-by-packet basis. The signals of the data portion thus corrected are converted to subcarrier signals.

10 Claims, 13 Drawing Sheets

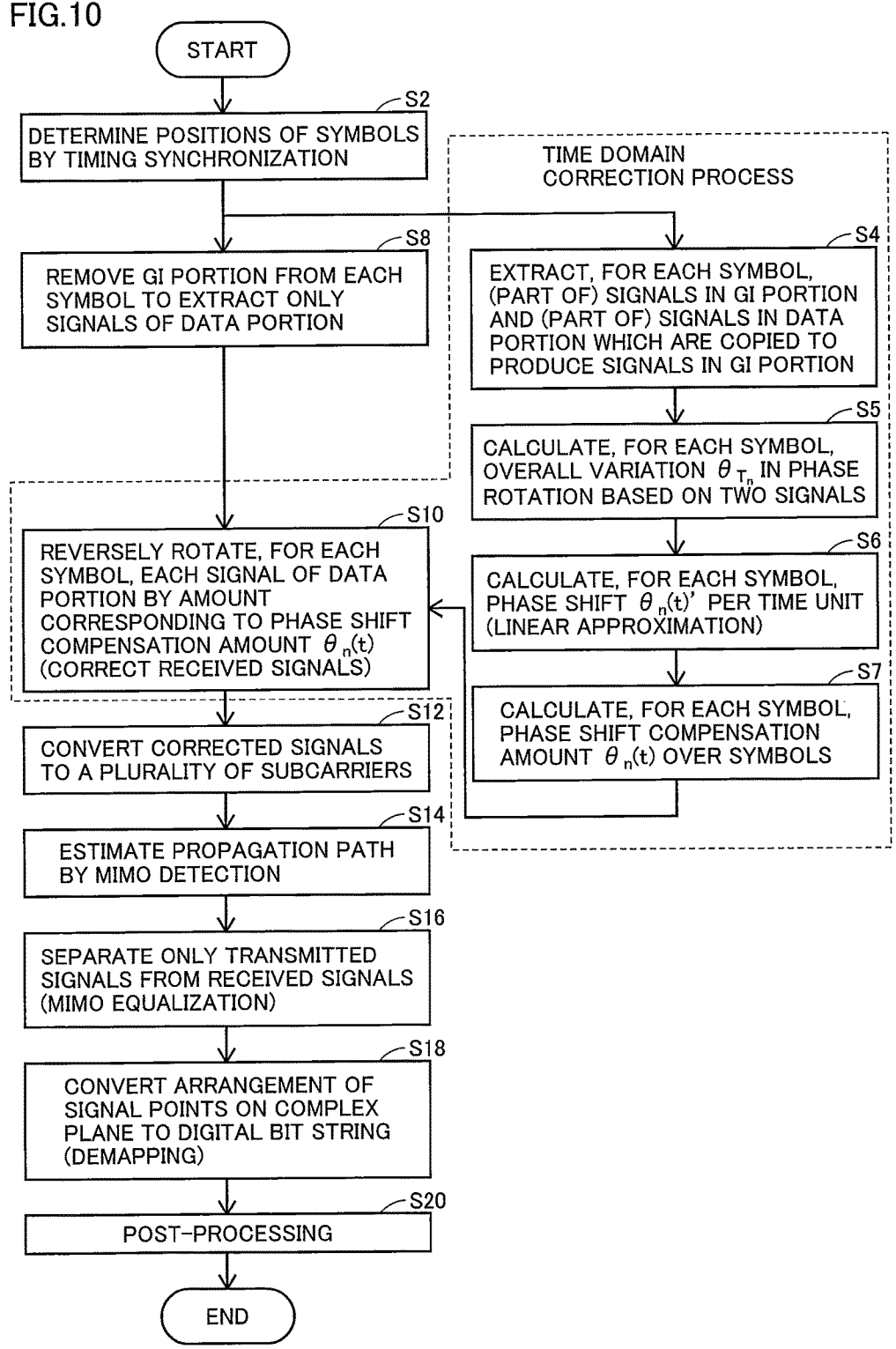

WIRELESS RECEIVING DEVICE AND RECEIVED DATA RESTORING

BACKGROUND OF THE INVENTION

Field of the Invention

The present invention relates to wireless receiving devices and received data restoring devices, and more particularly to wireless receiving devices and received data restoring devices that are used in wireless communication systems that perform multicarrier transmission by a multiple-input and multiple-output (MIMO) system.

Background Art

Wireless communication systems that perform multicarrier transmission are ideally designed so that local oscillator circuits of both a transmitter and a receiver generate the same carrier frequency. In actual environments, however, the carrier frequency of the local oscillator circuit varies between the transmitter and the receiver. Similarly, a sampling frequency of a digital to analog (DA) converter or an analog to digital (AD) converter also varies between the transmitter and the receiver. That is, a received signal that is processed by the receiver contains such frequency offsets.

In wireless communication using an orthogonal frequency division multiplexing (OFDM) system, orthogonality among subcarriers is affected by a frequency offset of a received signal, which causes inter-carrier interference. Accordingly, a technique of correcting a frequency offset in OFDM receiving devices is conventionally proposed.

For example, International Publication No. 2007/091320 discloses that the amount of phase rotation of each symbol is estimated by a guard interval (GI) method, and an oscillating frequency of an oscillation signal that is output to an RF unit is corrected in an analog manner according to the amount of offset of a carrier frequency obtained by the amount of phase rotation.

Japanese Unexamined Patent Publication No. 2000-224134 discloses digital correction of a phase error of each symbol caused by a carrier frequency error and a guard interval period.

Japanese Unexamined Patent Publication No. 2006-108763 discloses digital correction of a change in phase of each OFDM symbol caused by a shift of a sampling frequency between a transmitter and a receiver.

SUMMARY OF INVENTION

In wireless communication systems using what is called a single input, single output (SISO) system, or a system using only one transmitting antenna and one receiving antenna, a frequency offset is regarded as a fixed value, and inter-subcarrier interference is reduced even by coarsely correcting the frequency offset. For example, it is known that, in devices that generate a carrier frequency of the 5 GHz band, sufficient restoration accuracy is achieved by correcting a frequency offset to about 5 ppm.

In wireless communication systems using a MIMO system, however, sufficient restoration accuracy cannot be achieved by conventional frequency offset correction because complicated channel estimation and accurate MIMO decoding for multiple streams are required. In particular, in the case where the number of streams is large, the frequency offset and the accuracy of the frequency offset correction affects MIMO decoding.

The present invention was developed to solve the above problems, and it is an object of the present invention to provide a wireless receiving device and a received data restoring device which can improve the restoration ratio of received data even if the number of streams is large.

According to one aspect of the present invention, a wireless receiving device for use in a wireless communication system that performs multicarrier transmission by a MIMO system includes: a plurality of receiving antennas that receive transmitted signals of a plurality of streams; a demodulation unit that demodulates a signal in an RF band received by each of the receiving antennas to output a baseband signal; and a digital processing unit that restores received data by digitally processing the baseband transmission signal on a stream-by-stream basis. The digital processing unit includes an extraction unit, an estimation unit, a correction unit, and a conversion unit. The extraction unit removes, for each symbol of the transmission signal, signals of a redundant portion to extract signals of a data portion. The estimation unit estimates, for each symbol, an amount of phase rotation per time unit of the data portion by linearly approximating an overall variation in phase rotation of the symbol calculated by using the signals of the redundant portion. The correction unit individually corrects each of the signals of the data portion based on the amount of phase rotation per time unit estimated by the estimation unit to correct the signals of the data portion in a single symbol and over a plurality of the symbols accordingly on a packet-by-packet basis. The conversion unit converts the signals of the data portion corrected by the correction unit to subcarrier signals.

Preferably, the correction unit calculates, for each symbol, a phase shift compensation amount for each signal of the data portion by adding an amount of phase rotation of the previous symbol or symbols to the amount of phase rotation per time unit. It is desirable that the correction unit correct each signal of the data portion by reversely rotating each signal of the data portion by an amount corresponding to the calculated phase shift compensation amount.

Preferably, the digital processing unit further includes a unit that calculates the overall variation in phase rotation of the symbol as an average value of rotation amounts calculated by using the signals of the redundant portion for each of the plurality of streams.

Preferably, the digital processing unit further includes a MIMO processing unit, a linear approximation unit, and a subcarrier correction unit. The MIMO processing unit separates the subcarrier signals received from the conversion unit for each stream to produce separated subcarrier signals. The linear approximation unit linearly approximates, for each frequency domain symbol, the variation in phase rotation based on pilot subcarriers included in the separated subcarrier signals to obtain a linear expression. The subcarrier correction unit calculates, based on the linear expression obtained by the linear approximation unit, a phase shift of each data subcarrier included in the separated subcarrier signals of each frequency domain symbol, and reversely rotates each data subcarrier by an amount corresponding to the phase shift.

It is desirable that the linear approximation unit obtain the linear expression for each frequency domain symbol by using an average value of the plurality of streams for each of the pilot subcarriers.

According to another aspect of the present invention, a received data restoring device that restores received data by digitally processing a baseband transmission signal on a stream-by-stream basis includes: an extraction unit; an estimation unit; a correction unit; and a conversion unit. The extraction unit removes, for each symbol of the transmission signal, signals of a redundant portion to extract signals of a data portion. The estimation unit estimates, for each symbol, an amount of phase rotation per time unit of the data portion by linearly approximating an overall variation in phase rotation of the symbol calculated by using the signals of the redundant portion. The correction unit individually corrects each of the signals of the data portion based on the amount of phase rotation per time unit estimated by the estimation unit to correct the signals of the data portion in a single symbol or over a plurality of the symbols accordingly on a packet-by-packet basis. The conversion unit converts the signals of the data portion corrected by the correction unit to subcarrier signals.

According to the present invention, the restoration ratio of received data can be improved even if the number of streams is large.

BRIEF DESCRIPTION OF DRAWINGS

FIG. 10 is a flowchart illustrating a received data restoration process in the first embodiment of the present invention.

DESCRIPTION OF EMBODIMENTS

Figure 1:
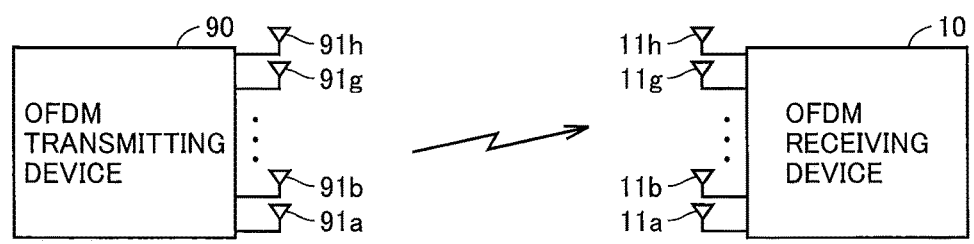
FIG. 1 is a diagram generally showing a MIMO-OFDM communication system according to a first embodiment of the present invention.

Embodiments of the present invention will be described in detail below with reference to the accompanying drawings. The same or corresponding portions are denoted with the same reference characters throughout the figures, and description thereof will not be repeated.

First Embodiment

First, a MIMO-OFDM receiving device according to a first embodiment will be generally described.

Referring to FIG. 1, a MIMO-OFDM receiving device (hereinafter simply referred to as the "OFDM receiving device") 10 receives a signal transmitted wirelessly from a MIMO-OFDM transmitting device (hereinafter simply referred to as the "OFDM transmitting device") 90. Both the OFDM transmitting device 90 and the OFDM receiving device 10 have a plurality of antennas, so that data transmission such as transmission of video data etc. is performed by a MIMO system. The wireless communication system of the present embodiment uses, e.g., an 8×8 MIMO system and assigns antennas on a subcarrier-by-subcarrier basis to perform stream transmission.

In this case, the OFDM transmitting device 90 includes eight antennas 91 (91a to 91h), and the OFDM receiving device 10 includes eight antennas 11 (11a to 11h). The OFDM transmitting device 90 divides data to be transmitted into a plurality of streams and transmits these different streams simultaneously from the antennas 91a to 91h. The antennas 11a to 11h of the OFDM receiving device 10 simultaneously receive the signal strings of the streams transmitted from the antennas 91 of the OFDM transmitting device 90. The OFDM receiving device 10 demodulates the signals received by the antennas 11 and separates mixed stream data from the received signals resulting from the demodulation.

The OFDM receiving device 10 and the OFDM transmitting device 90 use a quadrature amplitude modulation (QAM) system. For example, the OFDM receiving device 10 and the OFDM transmitting device 90 selectively or fixedly use one of 256-QAM, 64-QAM, 16-QAM, and quadrature phase shift keying (QPSK).

The OFDM receiving device 10 restores data by digitally processing the received signals resulting from the demodulation. Accordingly, correct data cannot be obtained if any received signal that is input to a digital circuit has distortion. This will be described with reference to FIG. 2. In order to facilitate understanding, FIG. 2 shows an example of data transmission in the case where both the OFDM transmitting device 90 and the OFDM receiving device 10 have one antenna (one stream).

Figure 2:
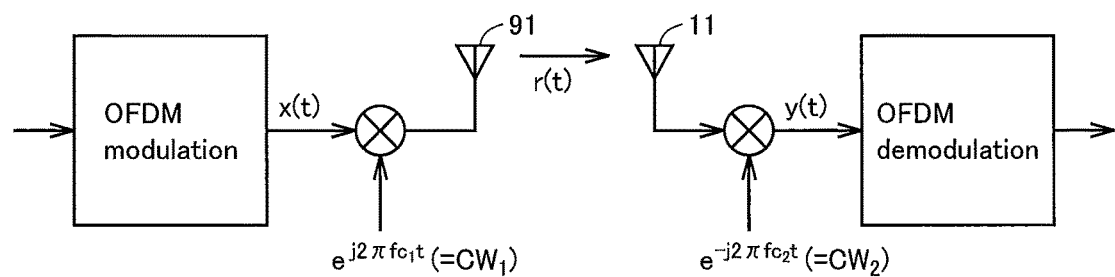
FIG. 2 is a diagram illustrating how received signals are affected in the case where a carrier frequency of a MIMO-OFDM receiving device is different from that of a MIMO-OFDM transmitting device according to the first embodiment of the present invention.

Referring to FIG. 2, the OFDM transmitting device 90 transmits a signal r(t) in a radio frequency (RF) band (hereinafter referred to as the "RF signal") from the antenna 91. The RF signal r(t) is produced by modulating a carrier $CW_1$ by a baseband signal x(t). Specifically, the RF signal r(t) is produced by multiplying the carrier $CW_1$ by the signal x(t).

The OFDM receiving device 10 obtains a baseband received signal y(t) by demodulating the RF signal r(t)

received by the antenna 11. The received signal y(t) is produced by multiplying the RF signal r(t) by a carrier $CW_2$.

Ideally, the carrier frequency $fc_1$ of a transmitter and the carrier frequency $fc_2$ of a receiver have the same value fc, and the carrier $CW_1$ of the transmitter and the carrier $CW_2$ of the receiver are therefore represented as follows.

$$CW_1 = e^{j2\pi fc t}$$

$$CW_2 = e^{-j2\pi fc t} \quad \text{[Expression 1]}$$

In this case, the received signal y(t) is the same as the transmitted signal x(t), as given by the following expression (1).

[Expression 2]

$$y(t) = x(t)e^{j2\pi fc t} \times e^{-j2\pi fc t} = x(t)e^{j2\pi fc t - j2\pi fc t} = x(t)e^0 = x(t) \quad (1)$$

In actual environments, however, the carrier frequency $fc_1$ of the transmitter and the carrier frequency $fc_2$ of the receiver do not have the same value fc, and the carrier $CW_1$ of the transmitter and the carrier $CW_2$ of the receiver are therefore represented as follows.

[Expression 3]

$$CW_1 = e^{j2\pi fc_1 t}$$

$$CW_2 = e^{-j2\pi fc_2 t}$$

In this case, the received signal y(t) is not the same as the transmitted signal x(t), and the received signal y(t) contains the difference between the carrier frequency $fc_1$ of the transmitter and the carrier frequency $fc_2$ of the receiver, namely an error corresponding to an offset Δf, as given by the following expression (2). Namely, the received signal y(t) has been rotated in phase.

[Expression 4]

$$y(t) = x(t)e^{j2\pi fc_1 t} \times e^{-j2\pi fc_2 t} = x(t)e^{j2\pi fc_1 t - j2\pi fc_2 t} = x(t)e^{j2\pi (fc_1 - fc_2)t} = x(t)e^{j2\pi \Delta f t} \quad (2)$$

The OFDM receiving device 10 according to the present embodiment has a function to compensate the phase rotation due to the carrier frequency offset Δf. The configuration and operation of the OFDM receiving device 10 having such a function will be described in detail below.

(Configuration)

Figure 3:
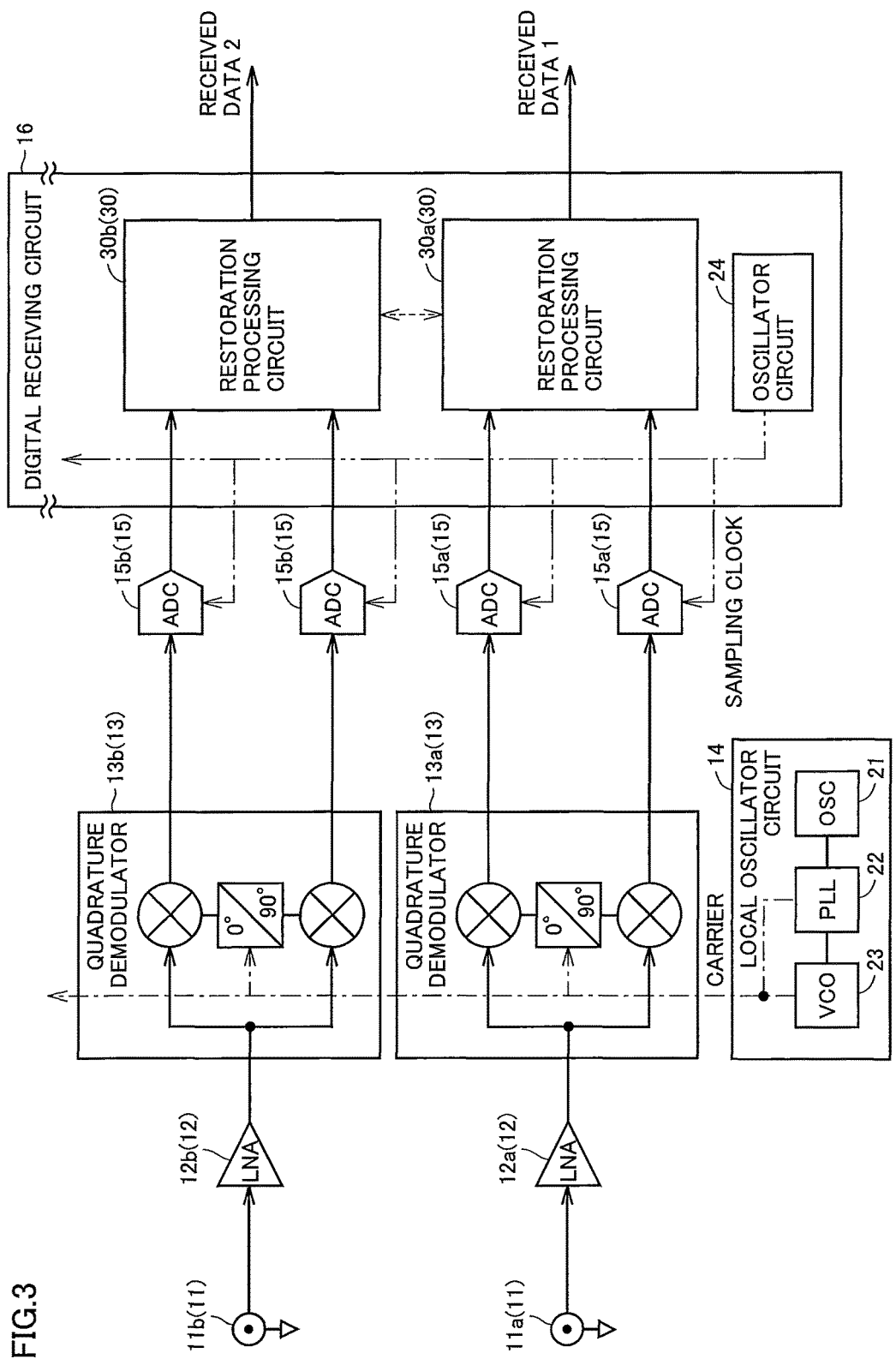
FIG. 3 is a block diagram showing the circuit configuration of the MIMO-OFDM receiving device according to the first embodiment of the present invention.

FIG. 3 is a block diagram schematically showing the circuit configuration of the OFDM receiving device 10 according to the present embodiment. FIG. 3 representatively shows the configuration required to restore received data 1, 2 from RF signals received by two antennas 11a, 11b out of the eight antennas 11a to 11h.

Referring to FIG. 3, the OFDM receiving device 10 includes low noise amplifiers (LNAs) 12 (12a, 12b, . . . ), a local oscillator circuit 14, and quadrature demodulators 13 (13a, 13b, . . . ). The low noise amplifiers (LNAs) 12 (12a, 12b, . . . ) amplify RF signals received by the receiving antennas 11 (11a, 11b, . . . ). The local oscillator circuit 14 generates a carrier. The quadrature demodulators 13 (13a, 13b, . . . ) demodulate the RF signals based on the carrier to obtain analog OFDM signals. In the present embodiment, an analog RF circuit includes only one local oscillator circuit 14 in order to make fluctuation in frequency in each channel uniform. Similarly, the OFDM transmitting device 90 includes only one local oscillator circuit. The local oscillator circuit 14 is comprised of a crystal oscillator (OSC) 21, a phase locked loop (PLL) 22, and a voltage controlled oscillator (VCO) 23.

The OFDM receiving device 10 further includes pairs of AD converters (ADCs) 15 (15a, 15b, . . . ) and restoration processing circuits 30 (30a, 30b, . . . ). The pairs of AD converters 15 (15a, 15b, . . . ) convert analog OFDM signals to digital OFDM signals. The restoration processing circuits 30 (30a, 30b, . . . ) digitally process the digital OFDM signals to obtain received data. The same number of restoration processing circuits 30 as the number of antennas 11 (the number of streams) are mounted on a digital receiving circuit 16 serving as a digital processing unit. The digital receiving circuit 16 includes a single oscillator circuit 24 that outputs a sampling clock to each AD converter 15.

Figure 4:
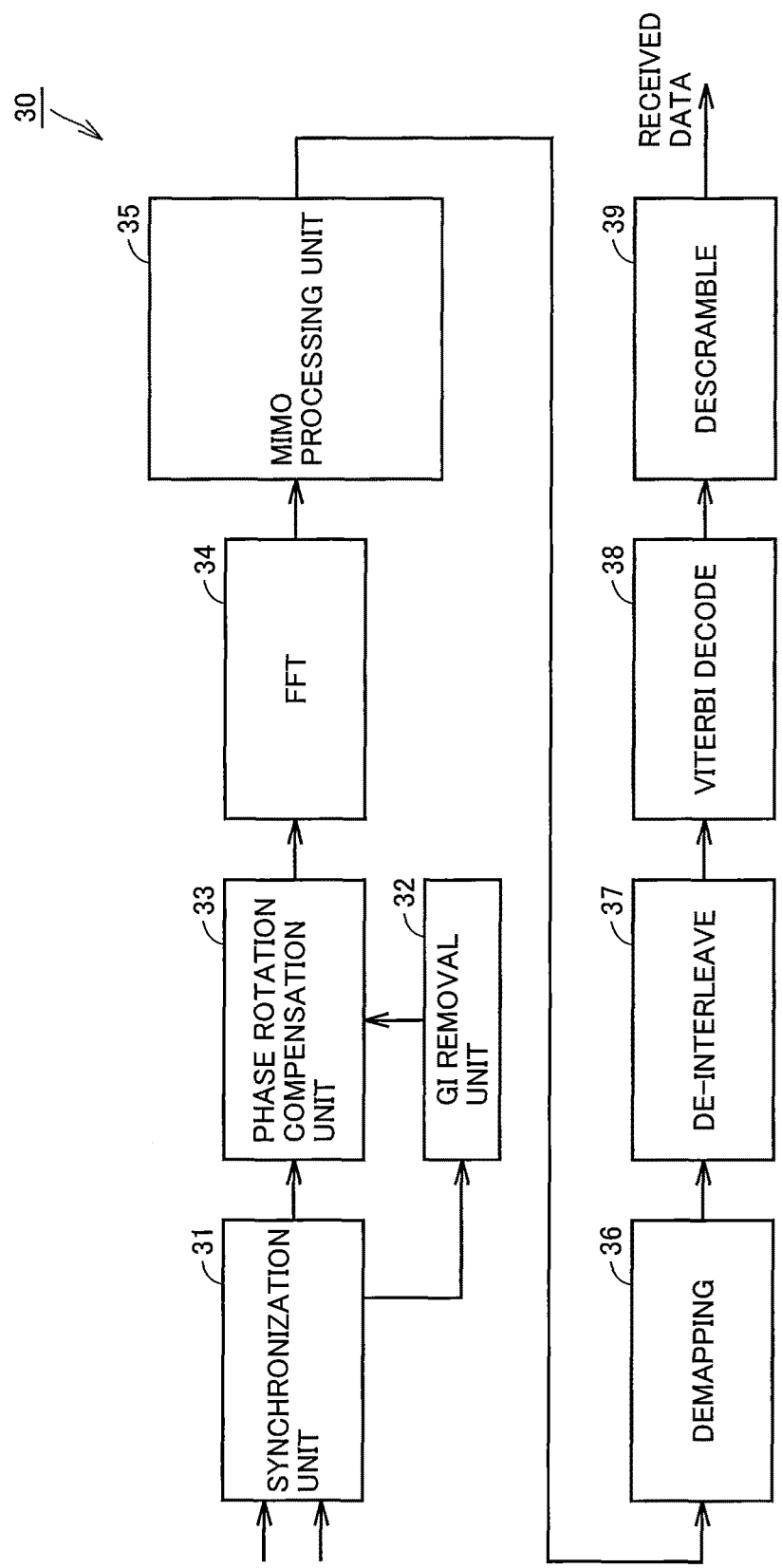
FIG. 4 is a block diagram showing the functional configuration of the restoration processing circuit shown in FIG. 3.

The detailed functional configuration of the restoration processing circuit 30 is shown in FIG. 4. Referring to FIG. 4, each restoration processing circuit 30 includes a synchronization unit 31, a GI removal unit 32, a phase rotation compensation unit 33, a fast Fourier transform (FFT) unit 34, a MIMO processing unit 35, a demapping unit 36, a de-interleaving unit 37, a Viterbi decoding unit 38, and a descrambling unit 39.

Figure 5:
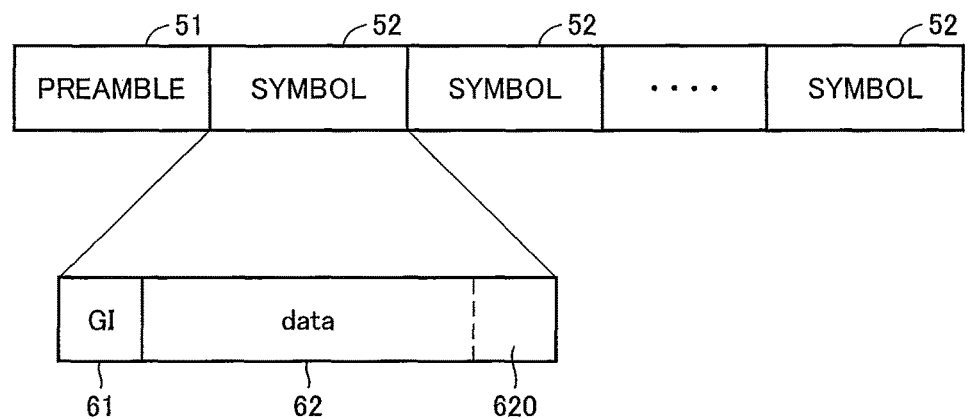
FIG. 5 is a diagram showing the data configuration of an OFDM signal that is output from a synchronization unit in the first embodiment of the present invention.

The synchronization unit 31 receives the digital OFDM signals (transmission signals) from the AD converters 15. The synchronization unit 31 synchronizes data between the OFDM transmitting device 90 and OFDM receiving device 10 and determines the positions of symbols contained in the digital OFDM signals. As shown in FIG. 5, each OFDM signal is comprised of a preamble 51 and a plurality of (e.g., 20) symbols 52. Each symbol 52 is comprised of a GI portion 61 as a redundant portion, and a data portion 62. The signal of the GI portion 61 is a redundant signal produced by copying the signal of a rear end part 620 of the data portion 62.

The GI removal unit 32 removes the GI portion 61 from each symbol 52 to extract the signal of the data portion 62 (valid OFDM signal). The FFT unit 34 converts the valid OFDM signal to a data string by Fourier transform. That is, the FFT unit 34 converts the valid OFDM signal of each symbol 52 to subcarrier signals to perform channel equalization. The functions of the GI removal unit 32 and the FFT unit 34 may be implemented by a common circuit.

The MIMO processing unit 35 performs MIMO detection and MIMO equalization. Specifically, based on the subcarrier signals received from the FFT unit 34, the MIMO processing unit 35 estimates a propagation path by known MIMO detection and calculates a weight matrix. The MIMO processing unit 35 multiplies the data signal by the inverse matrix of the calculated weight matrix to separate only a required signal (transmitted signal). That is, the MIMO processing unit 35 separates the subcarrier signals for each stream. The subcarrier signals thus separated are herein referred to as the "separated subcarrier signals." The MIMO processing unit 35 is placed for the plurality of restoration processing circuits 30 included in the digital receiving circuit 16.

The demapping unit 36 converts arrangement of signal points on a complex plane, namely information on the phase and amplitude of the separated subcarrier signals, to a digital bit string. The de-interleaving unit 37 corrects an error in data caused at the time of communication. The Viterbi decoding unit 38 decodes data encoded at the time of transmission based on a Viterbi algorithm. The descrambling unit 39 restores the data string randomly converted at the time of transmission to obtain received data. The received data obtained by the descrambling unit 39 is output from each restoration processing circuit 30.

In the present embodiment, each restoration processing circuit 30 includes the phase rotation compensation unit 33 as described above. The phase rotation compensation unit 33 is placed between the synchronization unit 31 and the FFT unit 34 and compensates for the phase rotation of the valid OFDM signal in a time domain. The phase rotation compensation unit 33 thus corrects the received signal y(t) shown in FIG. 2.

Figures 11A, 11B:
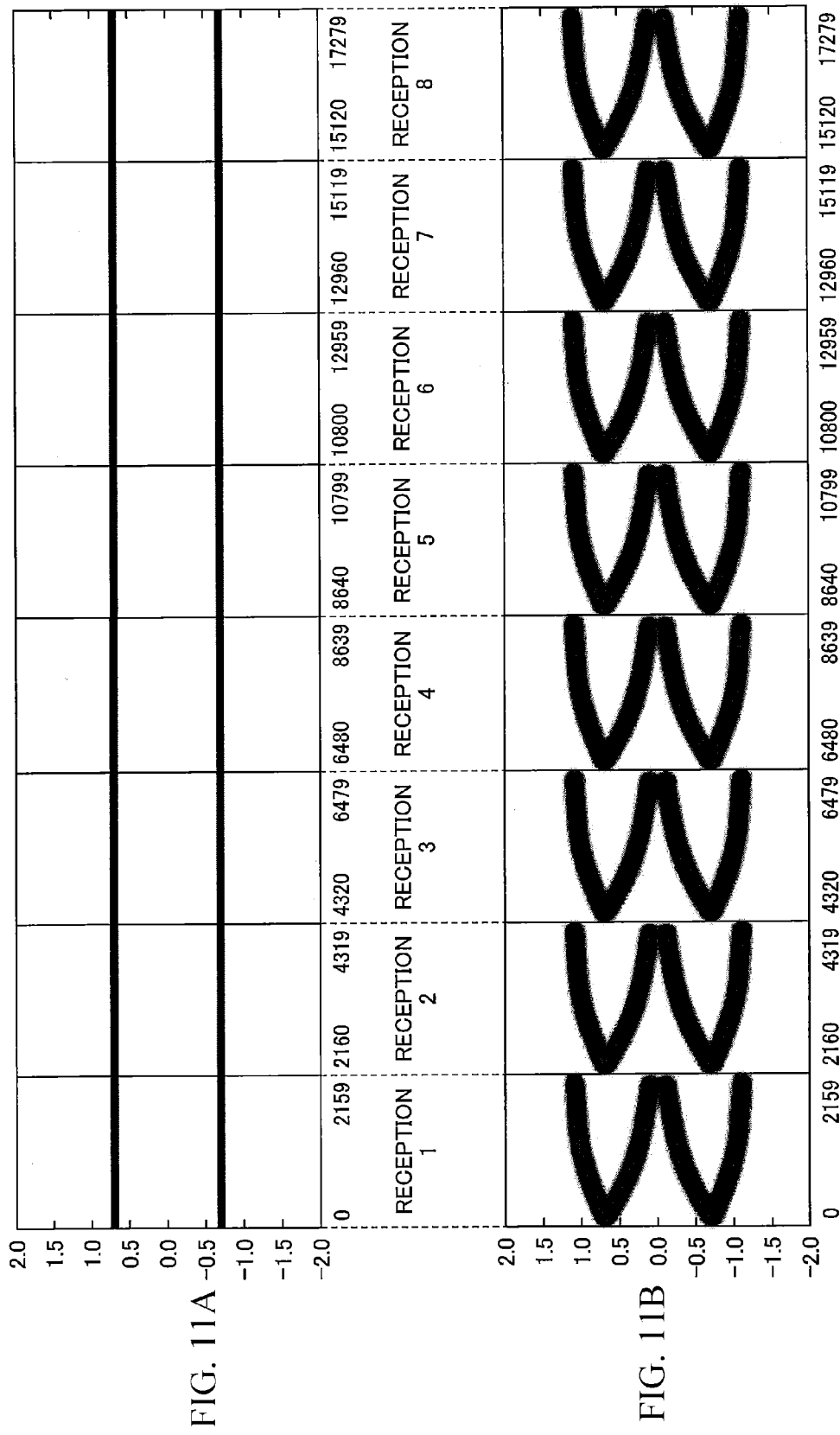
FIGS. 11A and 11B are diagrams showing the difference in output of a demapping unit between the case where there is no carrier frequency offset and the case where there is a carrier frequency offset.

FIGS. 11A and 11B show the difference in output of the demapping unit 36 between the case where there is no carrier frequency offset Δf and the case where there is a carrier frequency offset Δf.

FIG. 11A shows an example of ideal output in the case where there is no carrier frequency offset Δf, and FIG. 11B shows an example of output in the case where there is a carrier frequency offset Δf. FIGS. 11A and 11B show plotted values of all separated subcarrier signals in the case where a single packet of data is transmitted by QPSK with 8×8 MIMO. Receptions 1 to 8 represent transmission data of the streams received by the antennas 11a to 11h. For example, in the case where a single packet contains 20 symbols, receptions 1 to 8 simultaneously receive data of symbol 1, data of symbol 2, . . . , and data of symbol 20 sequentially in chronological order of transmission.

In the example of ideal output shown in FIG. 11A, the plotted values are constant in every transmission data. However, if there is a carrier frequency offset Δf, the plotted values vary as shown in the output example of FIG. 11B due to the phase rotation of the valid OFDM signals. If the data is restored based on the output values shown in FIG. 11B, correct received data cannot be obtained. In the output example of FIG. 11B, the plot points vary due to noise of the analog RF circuit.

In the present embodiment, a crystal oscillator having relatively high performance among commercially available crystal oscillators is used as the crystal oscillator 21 in the local oscillator circuit 14, and accuracy of the carrier frequency is as high as about 0.5 ppm. Reducing the carrier frequency offset Δt to about 0.5 ppm in the analog RF circuit causes slight fluctuation in frequency due to device stability.

Such slight fluctuation in frequency is fluctuation having a minimum step that can be adjusted in the analog RF circuit or less. Such slight fluctuation in frequency causes no problem in an SISO system but affects the data restoration ratio in a MIMO system. For example, in an 8×8 MIMO system, it is required to correct the frequency offset Δt to about ¹⁄₁₀ (0.05 ppm) of the reduced frequency offset Δt in the analog RF circuit.

The phase rotation compensation unit 33 of the present embodiment performs the following processing in order to reduce the influence of such slight fluctuation in frequency (hereinafter sometimes referred to as the "dynamic frequency offset") between the transmitter and the receiver.

The phase rotation compensation unit 33 first calculates, for each symbol 52, an overall variation $\theta_T$ in phase rotation of the symbol 52 by using the signal of the GI portion 61. This calculation method will be described with reference to FIG. 6.

Figure 6:
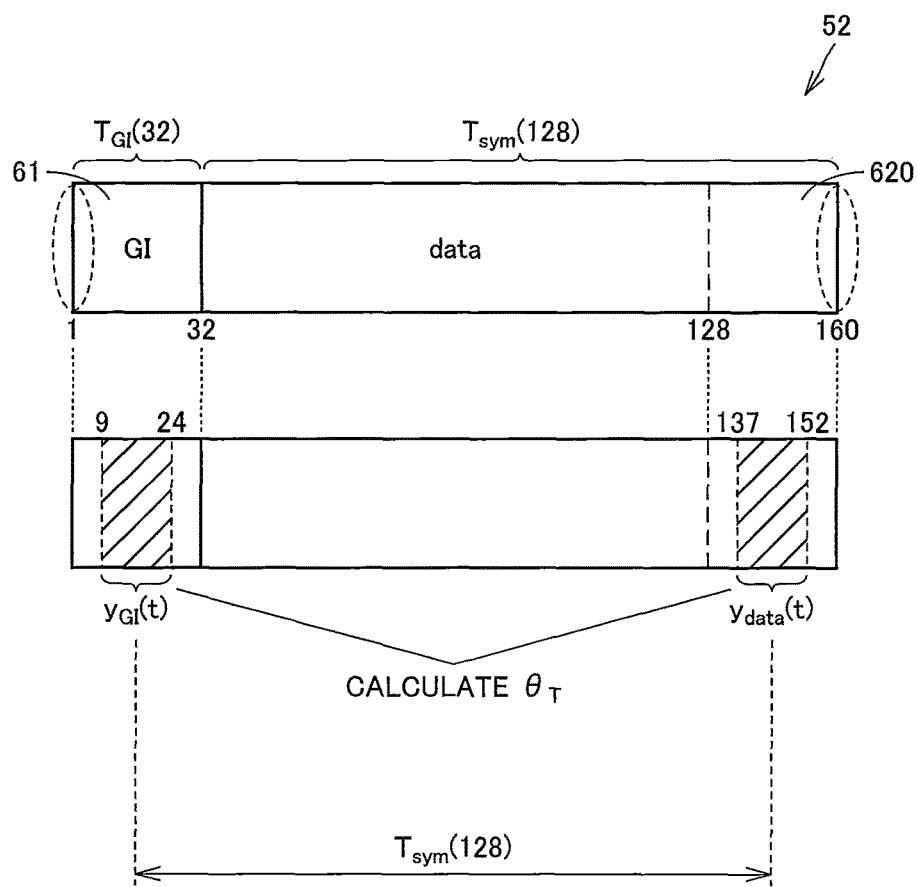
FIG. 6 is a diagram illustrating a method for calculating the overall variation in phase rotation of a symbol in the first embodiment of the present invention.

As shown in FIG. 6, in each symbol 52, the GI portion 61 contains guard interval data of $T_{GI}$ points, and the data portion 62 contains valid data of $T_{sym}$ points. For example, it is herein assumed that the total number of points in the data portion 62 is 160, the number of $T_{GI}$ points is 32, and the number of $T_{sym}$ points is 128. Since the symbol 52 contains the same data as the guard interval data in the $T_{GI}$ points of the rear end part 620 of the valid data of the $T_{sym}$ points, certain data $y_{GI}(t)$ in the GI portion 61 is the same as data $y_{data}(t)$ located the $T_{sym}$ points after the certain data $y_{GI}(t)$. The variation $\theta_T$ in phase rotation of the valid OFDM signal for the $T_{sym}$ points (i.e., the overall variation $\theta_T$ in phase rotation of the symbol 52) can be calculated for each symbol 52 by comparing the data $y_{GI}(t)$ with the data $y_{data}(t)$.

Specifically, the comparative data $y_{data}(t)$ in the data portion 62 which is separated from the comparative data $y_{GI}(t)$ in the GI portion 61 by the $T_{sym}$ points is given by the following expression (3) due to the phase rotation.

[Expression 5]

$$y_{data}(t)=s(t)e^{j2\pi\Delta f T_{sym}} \quad (3)$$

where s(t) represents the comparative data $y_{GI}(t)$ in the GI portion 61.

The comparative data $y_{GI}(t)$ and the comparative data $y_{data}(t)$ are complex numbers, and a signal d(t) obtained by multiplying the comparative data $y_{GI}(t)$ by its complex conjugate $y_{GI}(t)^*$ is given by the following expression (4). The signal is thus rotated on a complex plane.

[Expression 6]

$$d(t)=y_{GI}(t)^* y_{data}(t)=|s(t)|^2 e^{j2\pi\Delta f T_{sym}} \quad (4)$$

The variation $\theta_T$ in phase rotation for the $T_{sym}$ points in each symbol 52 is calculated as an average value of rotation amounts d(t) of streams 1 to 8. That is, the overall variation $\theta_T$ in phase rotation of a single symbol is given by the following expression (5). According to this expression (5), the carrier frequency offset Δf can be given by $\theta_T/2\pi T_{sym}$.

[Expression 7]

$$\theta_T=\arg(\text{sum}(d(t)))=2\pi\Delta f T_{sym} \quad (5)$$

Since the guard interval data is data that is inserted in order to restrain the influence of inter-symbol interference between the symbols 52 due to multipath fading, the data at the ends of the symbols 52, namely the data near the boundary between successive ones of the symbols 52, is not reliable. Accordingly, regarding both the GI portion 61 and the rear end part 620 of the data portion 62, only the data in the middle part is used as the comparative data. As used herein, the "data in the middle part" refers to the data excluding the data of one or more points at both ends of each portion, and for example, refers to the data excluding data of eight points at both ends of each portion. In this case, the data of points 9 to 24 in the GI portion 61 is the comparative data $y_{GI}(t)$ of the GI portion 61, and the data of points 137 to 152 in the rear end part 620 of the data portion 62 is the comparative data $y_{data}(t)$ of the data portion 62. The data to be used for comparison may be data of a single point in the GI portion 61 and in the rear end part 620 of the data portion 62.

Figure 7:
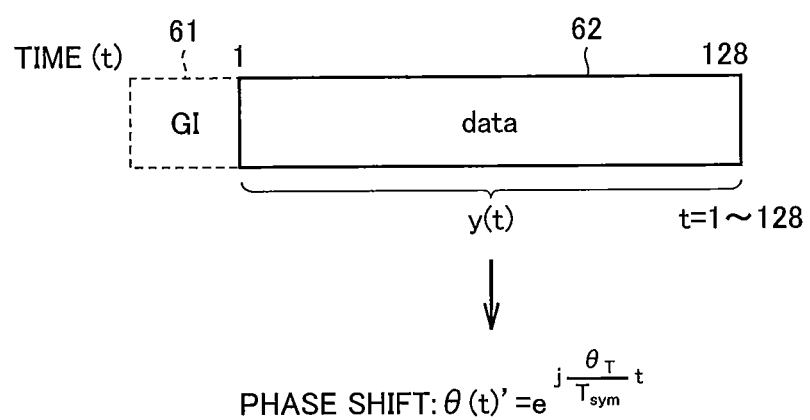
FIG. 7 is a diagram illustrating a phase shift of each signal of a data portion which is calculated for each symbol in the first embodiment of the present invention.

The phase rotation compensation unit 33 calculates a phase shift θ(t)' of each signal y(t) in the data portion 62 shown in FIG. 7 by linearly approximating the overall variation $\theta_T$ in phase rotation of the symbol 52. As described above, if the carrier frequency offset is reduced to about 0.5 ppm in the analog RF circuit, the frequency offset in a single symbol 52 changes gently. Accordingly, the amount of phase rotation per 1t (that is a time unit) in a single symbol 52 can be regarded as $\theta_T/T_{sym}$ ($T_{sym}=128$). The phase shift θ(t)' of each signal y(t) in the data portion 62 in a single symbol 52 is given by the following expression (6).

[Expression 8]

$$\theta(t)' = e^{j\frac{\theta_T}{T_{sym}}t} \quad (6)$$

Looking at only one symbol 52, each received signal y(t) of the data portion 62 is reversely rotated by an amount corresponding to the phase shift θ(t)', whereby a received signal resulting from correction (hereinafter referred to as the "corrected signal") y^(t) is obtained. For example, the received signals y(1) to y (128) of the data portion 62 are individually corrected as follows.

[Expression 9]

$$\hat{y(1)} = y(1) \cdot \theta^{-1}(1)' \quad \theta(1)' = e^{j\frac{\theta_T}{T_{sym}} \cdot 1}$$
$$\hat{y(2)} = y(2) \cdot \theta^{-1}(2)' \quad \theta(2)' = e^{j\frac{\theta_T}{T_{sym}} \cdot 2}$$
$$\vdots$$
$$\hat{y(128)} = y(128) \cdot \theta^{-1}(128)' \quad \theta(128)' = e^{j\frac{\theta_T}{T_{sym}} \cdot 128}$$

In the case of MIMO wireless communication as in the present embodiment, however, it is not sufficient to merely correct each received signal y(t) by using only the phase shift θ(t)' in the symbol 52. This is because the dynamic frequency offset affects a plurality of symbols 52.

The phase rotation compensation unit 33 of the present embodiment therefore corrects each received signal y(t) in a single symbol 52 and over the plurality of symbols 52 according to the phase shift θ(t)' of each signal calculated in each symbol 52. That is, for each packet, the phase rotation compensation unit 33 corrects each received signal y(t) in the subsequent symbol 52 according to correction of each received signal y(t) in the symbol 52 preceding this symbol 52.

In this case, the phase shift $\theta_n(t)$ that is used to correct each received signal $y_n(t)$ of the $n^{th}$ symbol 52 is the sum of the amount of phase rotation $\theta_{Tn}/T_{sym}$ per time unit of the $n^{th}$ symbol 52 and the amount(s) of phase rotation of the symbol(s) 52 preceding the $n^{th}$ symbol 52 (the first to (n−1)$^{th}$ symbols 52). The phase shift $\theta_n(t)$ that is obtained by adding the amount(s) of phase rotation of the preceding symbol(s) 52 is herein referred to as the "phase shift compensation amount $\theta_n(t)$."

Figure 8:
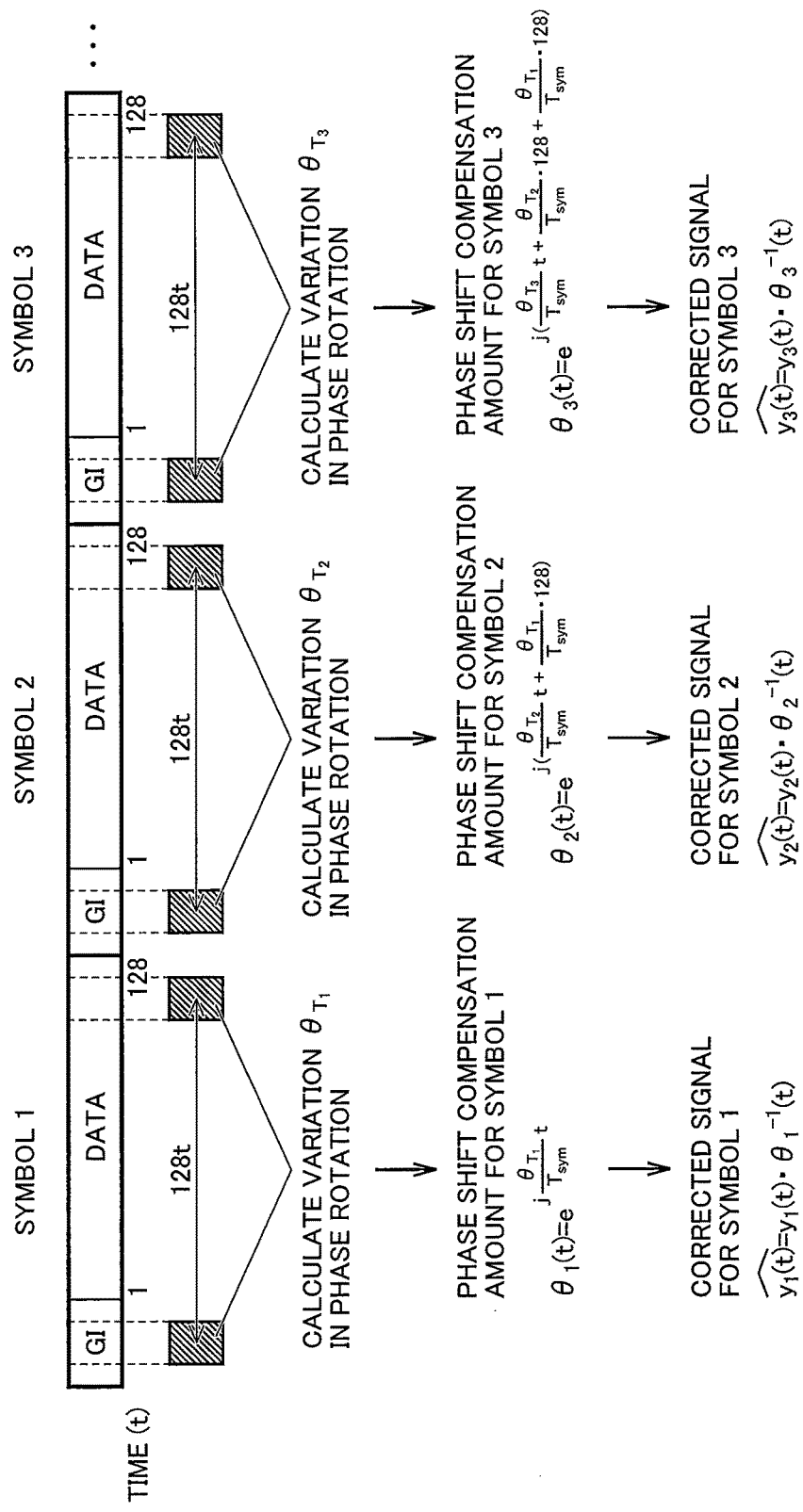
FIG. 8 is a diagram illustrating a method for correcting the signals of the data portion of each symbol in the first embodiment of the present invention.

Such follow-up correction of received signals y(t) will be described specifically with reference to FIG. 8. $\theta_{T1}$, $\theta_{T2}$, $\theta_{T3}$, . . . represent the overall variation in phase rotation of each symbol 1, 2, 3, . . . (per 128t) calculated by a GI method. In this case, in each packet, the phase shift compensation amount $\theta_1(t)$ of the first symbol 1 is calculated based only on the amount of phase rotation per 1t of symbol 1, $(\theta_{T1}/T_{sym})\cdot t$, as in the above expression (6). The phase shift compensation amount $\theta_1(t)$ of symbol 1 is thus given as follows.

[Expression 10]

$$\theta_1(t) = e^{j\frac{\theta_{T1}}{T_{sym}}t}$$

Accordingly, each data of the valid OFDM signal of the first symbol 1 in a certain packet is corrected only within symbol 1.

The phase shift compensation amount $\theta_2(t)$ of symbol 2 subsequent to symbol 1 is calculated by adding the amount of phase rotation of the previous symbol 1 $((\theta_{T1}/T_{sym})\cdot 128)$ to the amount of phase rotation per it of symbol 2 $((\theta_{T2}/T_{sym})\cdot t)$. The phase shift compensation amount $\theta_2(t)$ of symbol 2 is therefore given as follows.

[Expression 11]

$$\theta_2(t) = e^{j\left(\frac{\theta_{T2}}{T_{sym}}\cdot t + \frac{\theta_{T1}}{T_{sym}}\cdot 128\right)} = e^{j\frac{\theta_{T2}}{T_{sym}}\cdot t}\theta_1(128)$$

The phase shift compensation amount $\theta_2(t)$ of symbol 2 is calculated by multiplying the phase shift $\theta_2(t)'$ in symbol 2 by the overall shift compensation amount $\theta_1$ (128) of the previous symbol 1.

Similarly, the phase shift compensation amount $\theta_3(t)$ of symbol 3 subsequent to symbol 2 is calculated by adding the amounts of phase rotation of symbols 1, 2 preceding symbol 3, $((\theta_{T1}/T_{sym})\cdot 128, (\theta_{T2}/T_{sym})\cdot 128)$, to the amount of phase rotation per it of symbol 3 $((\theta_{T3}/T_{sym})\cdot t)$. The phase shift compensation amount $\theta_3(t)$ of symbol 3 is therefore given as follows.

[Expression 12]

$$\theta_3(t) = e^{j\left(\frac{\theta_{T3}}{T_{sym}}\cdot t + \frac{\theta_{T2}}{T_{sym}}\cdot 128 + \frac{\theta_{T1}}{T_{sym}}\cdot 128\right)} = e^{j\frac{\theta_{T3}}{T_{sym}}\cdot t}\theta_2(128)$$

The phase shift compensation amount $\theta_3(t)$ of symbol 3 is calculated by multiplying the phase shift $\theta_3(t)'$ in symbol 3 by the overall shift compensation amount $\theta_2$ (128) of the previous symbol 2.

Accordingly, in the case of correcting data (received signal) of t=1 to $T_{sym}$ in symbol n, the phase shift compensation amount $\theta_n(t)$ is given by the following expression (7), and the corrected signal $y_n(t)^{\wedge}$ of each data is given by the following expression (8). Ideally, the corrected signal $y_n(t)^{\wedge}$ of each data thus obtained corresponds to or is close to the original transmitted signal $x_n(t)$ transmitted from the OFDM transmitting device 90.

[Expression 13]

$$\theta_n(t) = e^{j\frac{\theta_{Tn}}{T_{sym}}\cdot t}\theta_{n-1}(T_{sym}) \quad (7)$$

$$\hat{y_n(t)} = y_n(t)\cdot \theta_n^{-1}(t) \quad (8)$$

The expression (7) is equivalent to the following expression (9) using the carrier frequency offset $\Delta f_n$ in symbol n.

[Expression 14]

$$\theta_n(t) = e^{j2\pi\Delta f_n t}\theta_{n-1}(T_{sym}) \quad (9)$$

Figure 9:
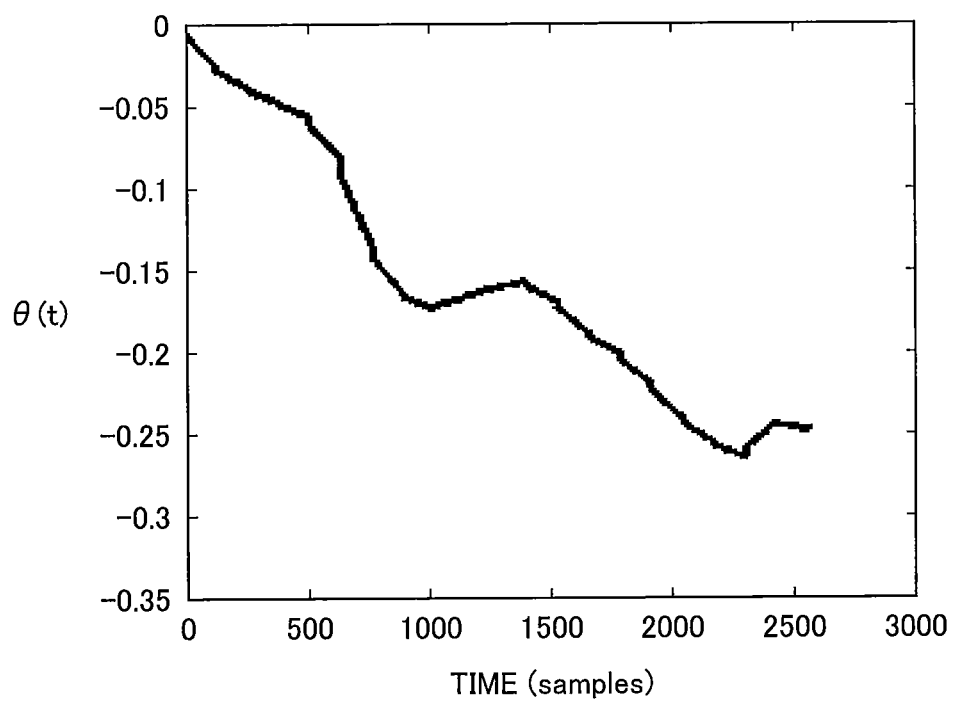
FIG. 9 is a graph showing a change in phase rotation analytically calculated for a certain packet in the first embodiment of the present invention.

The graph of FIG. 9 shows a change in phase rotation analytically calculated for a certain packet against time. A change in gradient of this graph shows that the carrier frequency offset Δf dynamically changes in a single symbol 52 and over the plurality of symbols 52.

According to the present embodiment, the signals of the data portion are individually corrected by using the phase shift compensation amount θ(t) in a single symbol and over the plurality of symbols, which is calculated for each symbol. For each packet, the phase rotation of the plurality of symbols is thus compensated for in a regulated manner by using the first symbol 1 as a reference. This can reduce distortion of each received signal due to slight fluctuation in carrier frequency, and thus can improve the restoration ratio of the MIMO-OFDM signal.

Since the average value of the rotation amounts d(t) of the plurality of streams is used as the overall variation $\theta_T$ in phase rotation of each symbol 52, the circuit scale can be reduced as compared to the case where the variation in phase rotation is calculated for each stream to correct the received signals of each stream.

(Operation)

Operation of the OFDM receiving device 10 according to the present embodiment will be described.

FIG. 10 is a flowchart showing a received data restoration process that is performed by the digital receiving circuit 16 of the OFDM receiving device 10 in the first embodiment of the present invention.

Referring to FIG. 10, the synchronization unit 31 determines the positions of symbols contained in a received OFDM signal by timing synchronization (step S2). Specifically, a plurality of symbols 52 contained in the OFDM signal are sequentially cut out.

The phase rotation compensation unit 33 extracts, for each symbol 52, (a part of) signals in the GI portion 61 and (a part of) signals in the rear end part 620 of the data portion 62 which are copied to produce the signals in the GI portion 61 (step S4).

By using the two signals extracted in S4, the phase rotation compensation unit 33 calculates, for each symbol 52, the overall variation $\theta_{Tn}$ in phase rotation of the symbol 52 according to the above expressions (4) and (5) (S5). The phase rotation compensation unit 33 also estimates (calculates), for each symbol 52, the phase shift $\theta_n(t)'$ per time unit in the symbol 52 by linearly approximating the overall variation $\theta_{Tn}$ in phase rotation of the symbol 52 (S6).

Subsequently, the phase rotation compensation unit 33 calculates the phase shift compensation amount $\theta_n(t)$ over the symbols 52, sequentially from the first symbol 52, according to the above expression (7) (S7). The phase rotation compensation unit 33 calculates the phase shift compensation amount $\theta_n(t)$ in a single symbol 52 and over the symbols 52 of each signal in the data portion by multiplying the phase shift $\theta_n(t)'$ in the symbol 52 calculated in S6 by the phase shift compensation amount $\theta_{n-1}(T_{sym})$ of the previous symbol 52.

In parallel to or in series with such processing of the phase rotation compensation unit 33, the GI removal unit 32 removes the GI portion 61 from each symbol 52 to extract only the valid OFDM signal of the data portion 62 of each symbol 52 (S8).

Thereafter, the phase rotation compensation unit 33 corrects, for each symbol 52, the valid OFDM signal according to the expression (8) by reversely rotating each signal of the data portion 62 extracted in S8 by an amount corresponding to the phase shift compensation amount $\theta_n(t)$ calculated in S7 (S10). For each packet, each signal of the data portion 62 is thus corrected in a single symbol and over the plurality of symbols according to the amount of phase rotation per time unit.

Subsequently, the FFT unit 34 calculates Fourier transform of each corrected signal of the data portion 62 to convert the valid OFDM signal of each symbol 52 to subcarrier signals (subcarrier signals before separation for each stream) and to perform channel equalization (S12).

The MIMO processing unit 35 estimates a propagation path by MIMO detection (S14) and then performs MIMO equalization (S16). That is, the MIMO processing unit 35 separates only required signals (transmitted signals) from the received signals.

The demapping unit 36 converts arrangement of signal points of the separated subcarrier signals received from the MIMO processing unit 35 on a complex plane to a digital bit string (S18).

Subsequently, the de-interleaving unit 37, the Viterbi decoding unit 38, and the descrambling unit 39 perform post-processing (S20), whereby received data is output.

As described above, in the OFDM receiving device 10 according to the present invention, the phase rotation compensation unit 33 reduces the influence of the dynamic carrier frequency offset. The restoration ratio of received data can therefore be improved.

Second Embodiment

An OFDM receiving device according to a second embodiment of the present invention has a function to compensate for phase rotation of each received signal not only in a time domain but also in a frequency domain. The OFDM receiving device of the present embodiment will be described in detail below in terms of only the differences from the first embodiment.

Figure 12:
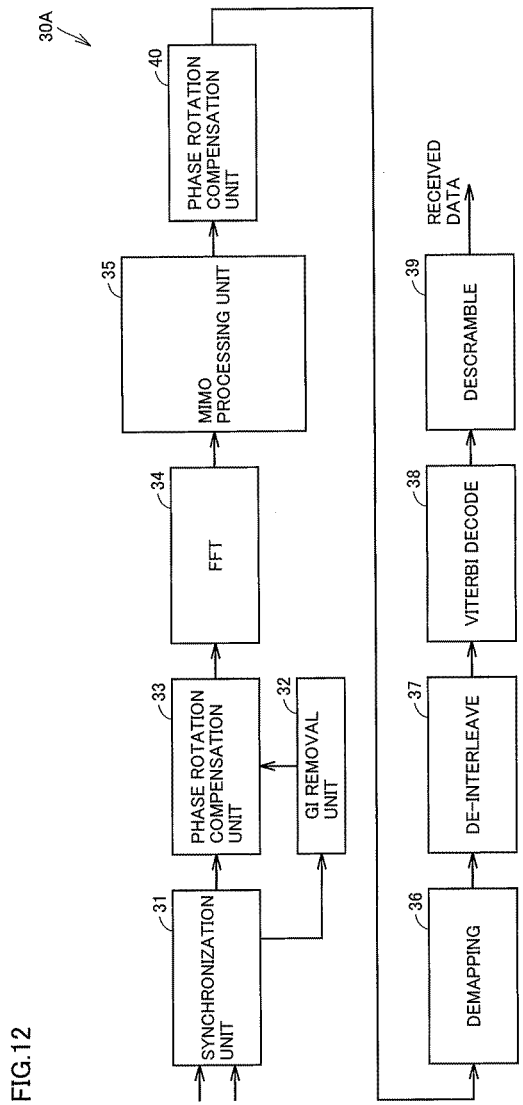
FIG. 12 is a block diagram showing the functional configuration of a restoration processing circuit in a MIMO-OFDM receiving device according to a second embodiment of the present invention.

FIG. 12 is a block diagram showing an example of the circuit configuration of a restoration processing circuit 30A included in the digital receiving circuit 16 of the OFDM receiving device 10 according to the present embodiment. The restoration processing circuit 30A includes another phase rotation compensation unit 40 in addition to the configuration shown in FIG. 4. The phase rotation compensation unit 40 is placed between the MIMO processing unit 35 and the demapping unit 36 to compensate for, in a frequency domain, phase rotation of each received signal which cannot be compensated for (or was not able to be compensated for) by correction in a time domain by the phase rotation compensation unit 33. That is, the phase rotation compensation unit 40 compensates for, in a frequency domain, the phase rotation of each received signal affected by at least a sampling frequency offset between the transmitter and the receiver.

First, the sampling frequency offset and its influence will be described, and the function of the phase rotation compensation unit 40 will then be described in detail. As shown in FIG. 3, the OFDM receiving device 10 includes the oscillator circuit 24 that outputs a sampling clock to the AD converter 15. The OFDM transmitting device 90 (FIG. 1) also includes an oscillator circuit (not shown) that outputs a sampling clock when carrying out digital to analog conversion of a signal resulting from inverse fast Fourier transform (IFFT). Both oscillator circuits cause a sampling frequency offset unless they are very high performance oscillator circuits. The sampling frequency offset affects the received signal resulting from FFT.

Specifically, the presence of the sampling frequency offset has two influences, namely (i) the length of OFDM symbols that have been cut out is increased or decreased, and (ii) the cutout position of OFDM symbols is shifted as closer to the end of a packet.

The influence (i) causes inter-carrier interference like the carrier frequency offset $\Delta f$. This influence becomes greater as the offset frequency divided by the baseband bandwidth increases. However, since the baseband bandwidth is typically larger than the subcarrier frequency interval, the influence of the sampling frequency offset is less than that of the carrier frequency offset and can be ignored.

The influence (ii) becomes greater in the case where long packets are transmitted in a system that performs channel equalization by using a preamble at the beginning of each packet especially as in the IEEE 802.11 standard. This is because the shift of the cut-out position increases as the number of symbols increases.

Figure 13:
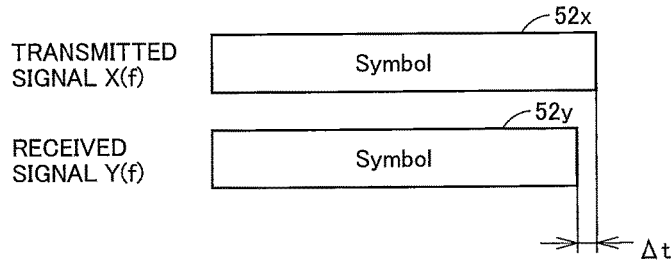
FIG. 13 is a diagram illustrating how received signals are affected in the case where a sampling frequency of the MIMO-OFDM receiving device is different from that of a MIMO-OFDM transmitting device according to the second embodiment of the present invention.

As shown in FIG. 13, if a symbol 52y is shifted in time by Δt from the starting point of an original symbol 52x, the symbols 52x, 52y have a difference in length, Δt, due to a time shift of FFT. That is, a received signal Y(f) resulting from FFT is a signal rotated in phase with respect to an original transmitted signal X(f).

[Expression 15]

$$Y(f)=X(f)e^{j2\pi \Delta t f}$$

Figure 16:
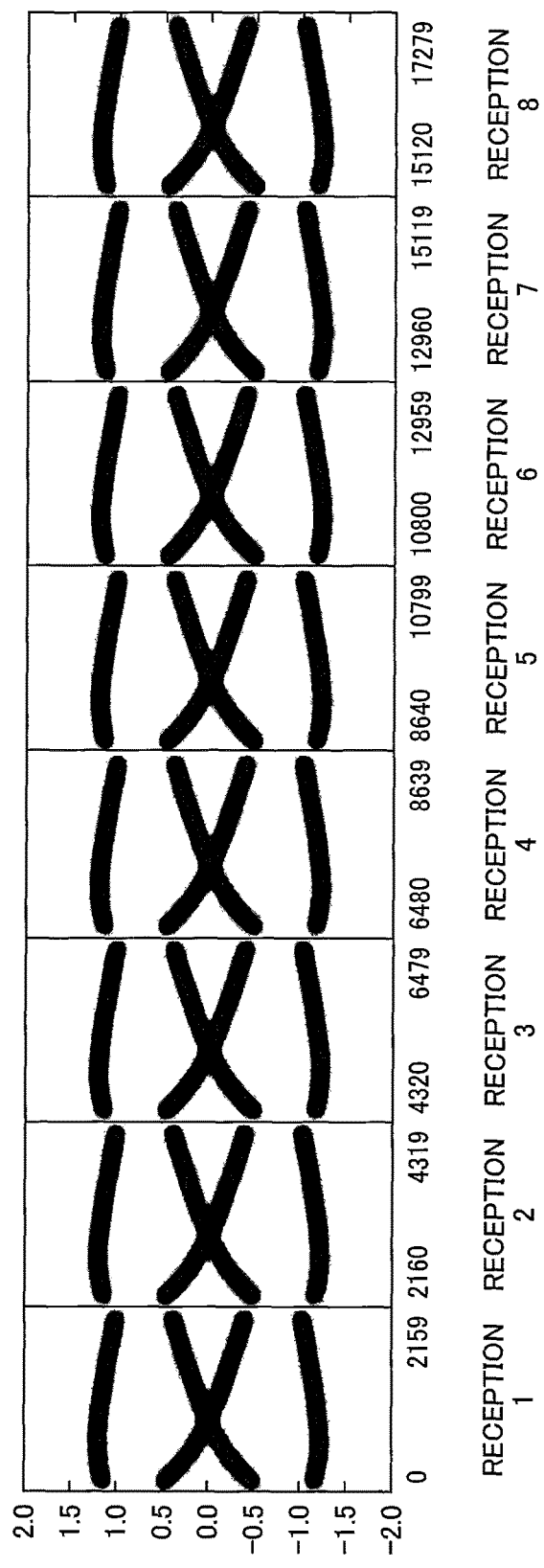
FIG. 16 is a diagram showing an output example of a demapping unit in the case where there is a sampling frequency offset.

In this case, each separated subcarrier signal that is produced by MIMO processing is rotated in phase. This causes an error in arrangement of signal points on a complex plane. If there is a sampling frequency offset (Δt), each stream (receptions 1 to 8) is subjected to incorrect phase rotation. FIG. 16 shows a typical example of plotted values of separated subcarrier signals in the case where there is a sampling frequency offset. As shown in FIG. 16, all of the streams in receptions 1 to 8 are subjected to incorrect phase rotation as all of these streams are affected by the frequency offset.

The phase rotation of the separated subcarrier signals produced by MIMO processing is also caused in the case where there is a residual carrier frequency offset. If a carrier frequency offset has not been completely corrected in a time domain, a shift of a convergent point occurs in arrangement of signal points on a complex plane due to the residual phase difference.

Improvement in restoration ratio of received data is thus limited if the carrier frequency is merely corrected in the manner described in the first embodiment. Accordingly, in the present embodiment, the sampling frequency offset and the residual carrier frequency offset are also digitally corrected by the phase rotation compensation unit 40.

The phase rotation compensation unit 40 linearly approximates a variation in phase rotation of each symbol 52y in a frequency domain (first-order approximation) based on pilot subcarriers as known signals embedded in each symbol, and corrects data subcarriers based on the linear expression obtained by the linear approximation. The symbols 52y in a frequency domain are herein sometimes referred to as the "frequency domain symbols" in order to distinguish these symbols from the symbols 52 in a time domain. A specific example of the processing that is performed by the phase rotation compensation unit 40 will be described with reference to the flowchart of FIG. 14.

Figure 14:
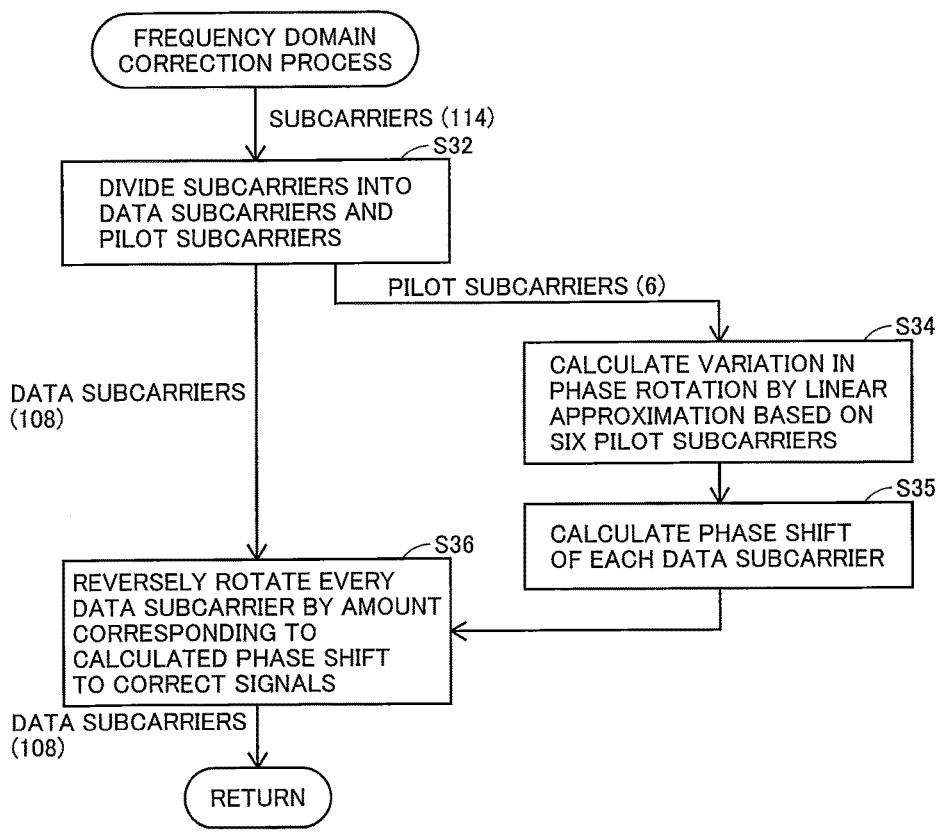
FIG. 14 is a flowchart illustrating a frequency domain correction process that is performed in the second embodiment of the present invention.

FIG. 14 is a flowchart illustrating a frequency domain correction process that is performed in the present embodiment. This correction process is inserted between the MIMO equalization process (S16) and the demapping process (S18) in the received data restoration processing shown in FIG. 10.

Referring to FIG. 14, the phase rotation compensation unit 40 divides the separated subcarrier signals received from the MIMO processing unit 35 into data subcarriers (data signals) and pilot subcarriers (pilot signals) (S32). In this example, the MIMO processing unit 35 outputs 114 separated subcarrier signals per symbol 52y, and the phase rotation compensation unit 40 divides the 114 separated subcarrier signals into 108 data subcarriers and 6 pilot subcarriers. For example, each symbol has the pilot signals embedded in the $6^{th}$, $34^{th}$, $48^{th}$, $67^{th}$, $81^{st}$, and $109^{th}$ subcarriers. The number of pilot subcarriers varies depending on the transmission bandwidth.

The phase rotation compensation unit 40 then calculates a variation (average) in phase rotation of each frequency domain symbol 52y by linear approximation based on the six pilot subcarriers in each stream (S34). Specifically, the phase rotation compensation unit 40 first obtains the average of each pilot subcarrier in streams 1 to 8. The average $P_{AVG}(k)$ of the $k^{th}$ received pilot signal is given by the following expression (10).

[Expression 16]

$$P_{AVG}(k)=\Sigma_{n=1}^{N}P_n(k) \qquad (10)$$

where k (=1, 2, 3, 4, 5, 6) represents a pilot number, n (=1, 2, 3, 4, 5, 6, 7, 8) represents a stream number, and $P_n(k)$ represents a received pilot signal.

Next, the phase rotation compensation unit 40 compares the stream average of the $k^{th}$ received pilot signal with a known pilot signal to calculate an error. In other words, the phase rotation compensation unit 40 multiplies the stream average of the $k^{th}$ received pilot signal by a complex conjugate $P_{REF}(k)^*$ of the known pilot signal as given by the following expression (11) to calculate a signal $P_d(k)$ rotated in phase.

[Expression 17]

$$P_d(k)=P_{AVG}(k)P_{REF}(k)^* \qquad (11)$$

In this case, the average variation θ(k) in phase rotation is represented as an argument of the calculated signal $P_d(k)$, as given by the following expression (12).

[Expression 18]

$$\theta(k)=\arg(P_d(k)) \qquad (12)$$

Figure 15:
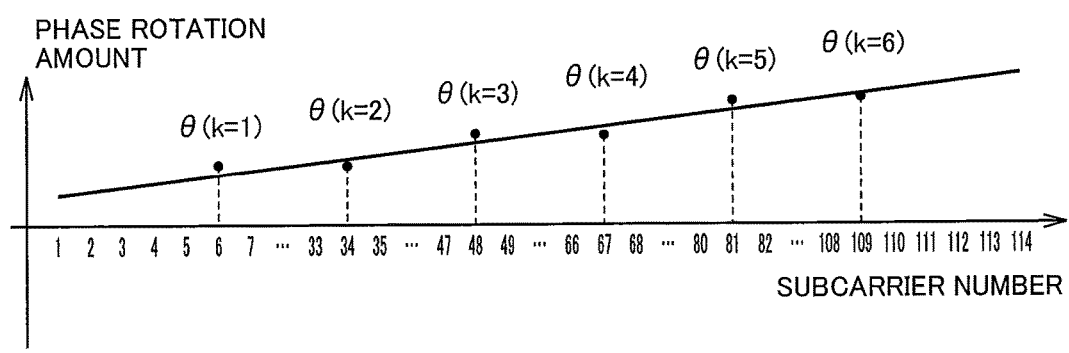
FIG. 15 is a graph schematically showing processing in step S34 of FIG. 14.

As shown in FIG. 15, the phase rotation compensation unit 40 linearly approximates the variation in phase rotation of each symbol based on the amount (average) of phase rotation of the six pilot signals. The gradient of the linear expression obtained by the linear approximation represents the influence of the sampling frequency offset Δt on a certain symbol.

Once the linear expression is thus obtained for each symbol, the phase rotation compensation unit 40 calculates a phase shift θ(t) of each data subcarrier y(f) of each frequency domain symbol 52y in each stream (S35), where f (=1, 2, . . . , 108) represents a data subcarrier number. Subsequently, the phase rotation compensation unit 40 corrects each data subcarrier y(f) in each stream according to the calculated phase shift θ(f) (S36). Specifically, the phase rotation compensation unit 40 reversely rotates every data subcarrier y(f) by an amount corresponding to the calculated phase shift θ(f), as given by the following expression (13).

[Expression 19]

$$\overline{Y(f)}=Y(f)e^{-j\theta(f)} \qquad (13)$$

As described above, the phase rotation compensation unit 40 obtains a linear expression common to all the streams for each frequency domain symbol 52y, and then calculates the phase difference (phase shift) between the linear expression and each data subcarrier. The phase rotation compensation unit 40 makes follow-up correction of data subcarriers in a single symbol in accordance with the calculated phase difference. Since optimal reverse phase rotation is made for each frequency domain symbol 52y, a dynamically changing sampling frequency offset and a residual carrier frequency offset can be digitally corrected appropriately.

Even in a frequency domain, the average value of the amounts of rotation of the plurality of streams is used as the variation θ(k) in phase rotation of each symbol 52y. Accordingly, the circuit scale can be reduced as compared to the case where the variation in phase rotation is calculated for each stream to correct the received signals of each stream.

As described above, in the present embodiment, phase rotation of each received signal is compensated for not only in a time domain but also in a frequency domain. This can minimize a change in plotted values of the demapping unit. Correct received data can therefore be obtained.

The number of streams is eight in the above embodiments. However, deterioration of received data can be minimized even if the number of streams is more than eight (e.g., a 16×16 MIMO system).

The above embodiments are described with respect to the OFDM receiving device 10. However, any wireless receiving device using a multicarrier transmission system other than an OFDM system may be used as long as a transmission signal to be received by the wireless receiving device contains symbols each comprised of a redundant portion and a data portion, each symbol is transmitted as a unit, and the wireless receiving device can calculate the overall variation in phase rotation of each symbol by using the signals of the redundant portion.

Only the function of the digital receiving circuit 16 of the OFDM receiving device 10 in each of the embodiments may be provided as a received data restoring device that restores received data. Such a received data restoring device restores received data by digitally processing a baseband transmission signal on a stream-by-stream basis.

The embodiments disclosed herein are by way of example in all respects and are not restrictive. The scope of the invention should be determined not by the above description but by the claims, and the invention is intended to include all modifications and equivalents which fall within the scope of the claims.

The invention claimed is:

1. A wireless receiving device for use in a wireless communication system configured to perform multicarrier transmission by a multiple-input and multiple-output (MIMO) system, the wireless receiving device comprising:
a plurality of receiving antennas configured to receive transmitted signals of a plurality of streams;
a demodulator configured to demodulate a signal in an RF band received by each of said receiving antennas to output a baseband signal; and
a digital receiving circuit including a plurality of restoration processing circuits, each of the restoration processing circuits being configured to restore received data by digitally processing said baseband transmission signal on a stream-by-stream basis,
wherein each restoration processing circuit is configured to:
remove for each symbol of said transmission signal, signals of a redundant portion to extract signals of a data portion,
estimate for each symbol, an amount of phase rotation per time unit of said data portion by linearly approximating an overall variation in phase rotation of said symbol calculated based on said signals of said redundant portion,
individually correct each of said signals of said data portion based on said amount of phase rotation per time unit to correct said signals of said data portion in a single symbol and over a plurality of said symbols accordingly on a packet-by-packet basis, the individual correction comprising:
calculating, for each symbol, a phase shift compensation amount for each signal of said data portion by adding an overall amount of phase rotation of the previous symbol or symbols in the packet to said amount of phase rotation per time unit; and
correcting each signal of said data portion by reversely rotating each signal of said data portion by an amount corresponding to said phase shift compensation amount after estimating the amount of phase rotation per time unit of said data portion, and
convert said signals of said data portion that are corrected to subcarrier signals by Fourier transform.

2. The wireless receiving device according to claim 1, wherein each restoration processing circuit is configured to calculate said phase shift compensation amount $\theta_n(t)$ in symbol n based on the following expression

[Expression 1]

$$\theta_n(t) = e^{j\frac{\theta_{T_n}}{T_{sym}} \cdot t} \theta_{n-1}(T_{sym})$$

where $T_{sym}$ is a quantity of valid data points included in the data portion, and $\theta_{T_n}$ is the amount of phase rotation of the $n^{th}$ symbol.

3. The wireless receiving device according to claim 1, wherein each restoration processing circuit is configured to calculate said overall variation in phase rotation of said symbol as an average value of rotation amounts calculated based on said signals of said redundant portion for each of said plurality of streams.

4. The wireless receiving device according to claim 1, wherein each restoration processing circuit is configured to:
separate said subcarrier signals for each stream to produce separated subcarrier signals,
linearly approximate for each frequency domain symbol, said variation in phase rotation based on pilot subcarriers included in said separated subcarrier signals to obtain a linear expression, and
calculate, based on said linear expression, a phase shift of each data subcarrier included in said separated subcarrier signals of each frequency domain symbol, and to reversely rotate each data subcarrier by an amount corresponding to said phase shift.

5. The wireless receiving device according to claim 4, wherein each restoration processing circuit is configured to:
obtain said linear expression for each frequency domain symbol based on an average value of said plurality of streams for each of said pilot subcarriers.

6. A received data restoring device configured to restore received data by digitally processing a baseband transmission signal on a stream-by-stream basis, the received data restoring device comprising a plurality of restoration processing circuits, each of the restoration processing circuits being configured to:
remove, for each symbol of said transmission signal, signals of a redundant portion to extract signals of a data portion;
estimate, for each symbol, an amount of phase rotation per time unit of said data portion by linearly approximating an overall variation in phase rotation of said symbol calculated based on said signals of said redundant portion;
individually correct each of said signals of said data portion based on said amount of phase rotation per time unit to correct said signals of said data portion in a single symbol and over a plurality of said symbols accordingly on a packet-by-packet basis, the individual correction comprising:

calculating, for each symbol, a phase shift compensation amount for each signal of said data portion by adding an overall amount of phase rotation of the previous symbol or symbols in the packet to said amount of phase rotation per time unit; and correcting each signal of said data portion by reversely rotating each signal of said data portion by an amount corresponding to said phase shift compensation amount after estimating the amount of phase rotation per time unit of said data portion; and convert said signals of said data portion that are corrected to subcarrier signals by Fourier transform.

7. The received data restoring device according to claim 6, wherein each restoration processing circuit is configured to calculate said phase shift compensation amount $\theta_n(t)$ in symbol n based on the following expression

[Expression 1]

$$\theta_n(t) = e^{j\frac{\theta_{T_n}}{T_{sym}} \cdot t} \theta_{n-1}(T_{sym})$$

where $T_{sym}$ is a quantity of valid data points included in the data portion, and $\theta_{T_n}$ is the amount of phase rotation of the $n^{th}$ symbol.

8. The received data restoring device according to claim 6, each restoration processing circuit is configured to calculate said overall variation in phase rotation of said symbol as an average value of rotation amounts calculated based on said signals of said redundant portion for each of said plurality of streams.

9. The wireless receiving device according to claim 6, wherein each restoration processing circuit is configured to:

separate said subcarrier signals for each stream to produce separated subcarrier signals, linearly approximate for each frequency domain symbol, said variation in phase rotation based on pilot subcarriers included in said separated subcarrier signals to obtain a linear expression, and calculate, based on said linear expression, a phase shift of each data subcarrier included in said separated subcarrier signals of each frequency domain symbol, and to reversely rotate each data subcarrier by an amount corresponding to said phase shift.

10. The received data restoring device according to claim 9, wherein each restoration processing circuit is configured to obtain said linear expression for each frequency domain symbol based on an average value of said plurality of streams for each of said pilot subcarriers.

* * * * *